United States Patent [19]
Tanaka et al.

[11] 3,839,151
[45] Oct. 1, 1974

[54] PROCESS FOR PRODUCING L-LYSINE BY FERMENTATION

[75] Inventors: Katsunobu Tanaka; Kazuo Ohshima; Yoh Toloro, all of Tokyo, Japan

[73] Assignee: Kyowa Hakko Kogyo Co., Ltd., Tokyo, Japan

[22] Filed: Aug. 30, 1972

[21] Appl. No.: 284,914

Related U.S. Application Data

[63] Continuation of Ser. No. 868,905, Oct. 23, 1969, abandoned.

[52] U.S. Cl............................................. 195/28 R
[51] Int. Cl............................................. C12b 1/00
[58] Field of Search........... 195/28, 29, 3 H, 30, 47, 195/49

[56] References Cited
UNITED STATES PATENTS 3,440,141  4/1969  Douros et al................... 195/28 R
3,595,751  7/1971  Nakayama et al................... 195/49
3,642,578  2/1972  Hitzman et al................... 195/28 R Primary Examiner—Lionel M. Shapiro
Assistant Examiner—R. B. Penland
Attorney, Agent, or Firm—Fitzpatrick, Cella, Harper & Scinto

[57] ABSTRACT

A process for producing L-lysine by aerobically cultivating a species of Nocardia in a nutrient medium containing a suitable source of carbon especially hydrocarbon, ethanol or mixtures thereof as the main source of carbon. Improved results are obtained by using nutrient deficient mutants of said species wherein at least one of homoserine, threonine and methionine are required for growth of the microorganism.

5 Claims, No Drawings

PROCESS FOR PRODUCING L-LYSINE BY FERMENTATION

This is a continuation, of application Ser. No. 868,905, filed Oct. 23, 1969 now abandoned.

BACKGROUND OF THE INVENTION

This invention relates to a process for producing L-lysine by fermentation. More specifically, it relates to a fermentation process using a species of the genus Nocardia and culturing that species in a suitable nutrient medium containing a suitable source of carbon and a source of nitrogen. Further, it relates to such a process wherein the source of carbon may be hydrocarbon, or ethanol, or mixtures thereof.

L-lysine is, of course a well-known and widely used food supplement and has been produced in fermentation processes. Heretofore, it has been known that homoserine requiring strains of *Micrococcus glutamicus* accumulate a remarkable amount of L-lysine by using a saccharine material as the assimilated raw material. (Journal of General and Applied Microbiology vol. 4, p. 128, 1958). Such a process has been widely regarded as the most advantageous one from the industrial point of view. It is to be noted, however, that the process requires a carbohydrate source rather than an inexpensive material such as hydrocarbon or ethanol, for example. On the other hand, processes using inexpensive hydrocarbons as the source of carbon have the disadvantage of providing only small amounts of L-lysine. Such a process has been reported by Iizuka et al (Journal of General and Applied Microbiology, vol. 9, pg. 23, 1963) and also by Yamada et al (amino acid, vol. 7, pg. 79, 1963). These processes, producing such small amounts of L-lysine are therefore not commercial.

DESCRIPTION OF THE INVENTION

In accordance with the present invention, a process has now been discovered whereby L-lysine is produced in substantial amounts by aerobically culturing a fermentation nutrient medium containing a suitable source of carbon, especially hydrocarbon, or ethanol, or mixtures thereof as the main source of carbon with a species of the genus Nocardia. It has also been discovered that certain nutrient-requiring mutants of such species are especially suitable for producing large amounts of L-lysine in the fermentation medium.

Such a discovery has evolved out of studies conducted by the present inventors into microorganisms from various sources which are capable of assimilating a source of carbon to produce amino acids. In the course of this work they have also succeeded in obtaining many suitable nutrient-requiring mutants from the above strains by ultraviolet irradiation and treatment with chemical agents. Such nutrient deficient strains are those which require at least one of homoserine, threonine or methionine.

Microorganisms belonging to the genus Nocardia have been found in accordance with the present invention to provide substantial amounts of L-lysine in an appropriate fermentation process. One such microorganism is a strain of a new species of the genus and has been designated as No. 258. Especially suitable nutrient deficient mutants thereof, designated as No. 258-NP-3 and No. 258-NP-4 are strains whose growth is promoted by adding thereto homoserine, threonine or methionine either singly or in combination. Such strains have a better ability to produce L-lysine than the homoserine deficient strains of Micrococcus known heretofore.

Of the microorganisms of the genus Nocardia used in the present invention, strain No. 258 belongs to a new species and has the following microbiological properties. The mutants thereof have the same properties as the present strain except for the above-mentioned nutritional requirements.

A. Morphological properties:
  1. Shape of bacterium: usually short rod, especially considerable variation of shape and branched cells are recognized at the initial stage of culture.
  2. Size: $0.8 - 1.0\mu \times 3 - 12\mu$ (an initial stage of culture)
  $0.6 - 0.8\mu \times 0.8 - 1.0\mu$ (a later stage of culture)
  3. Motility: non-motile
  Gram's staining: gram-positive B. Culturing properties:
  1. Bouillon agar plate: Growth moderate, circular, smooth, wholly framed opaque, wet, glistening.
  2. Bouillon agar slant: Growth moderate, filiform, wet, glistening, whitish-pink, buttery.
  3. Bouillon: Slightly turbid, the surface growth is membraneous powdered precipitate is formed.

C. Physical properties:
  1. Optimum temperature: $25° - 42°C$. excellent growth even at $42°C$.
  2. Optimum pH: $6.0 - 9.0$
  3. Oxygen requirement: aerobic
  4. Litmus milk: unchanged or alkaline
  5. Gelatin: not liquefied
  6. Hydrogen sulfide: produced
  7. Indole: not produced
  8. Starch: not decomposed
  9. Nitrate: reduced
  10. Catalase: positive
  11. Urease: positive
  12. The growth is excellent with the use of n-paraffins as a carbon source.
  13. Acid fast staining: negative
  14. Utilization of sugar: No acid from glucose, lactose, sucrose, xylose and glycerol.
  Acid from fructose, sorbitol and mannitol.

Based upon the above mycological properties, it was established that this strain is a new species belonging to the genus Nocardia according to the identification of said strain with Bergey's Manual of Determinative Bacteriology (7th edition).

As stated above, the fermentation medium used is a nutrient medium containing a suitable source of assimilable carbon. Preferred are hydrocarbon or ethanol or mixtures thereof as the main source of carbon. Additionally, the medium also contains a suitable nitrogen source, inorganic salts and organic nutrients.

The hydrocarbons to be used as the carbon source are aliphatic hydrocarbons having from 10 to 50 carbon atoms and mixtures thereof, aromatic hydrocarbons such as benzene, xylene, and toluene, gaseous hydrocarbons such as methane, ethane, propane, and butane, and crude hydrocarbon materials such as kerosene, light oil and crude oils. n-Paraffins having from 10 to 18 carbon atoms are especially preferable. The amount of hydrocarbons used is generally about from $5 - 10$ percent by weight. Good results are obtained by adding this either at once or portionwise, but portionwise addition has the advantage of preventing inhibition of microorganism growth in the initial stage.

As stated previously, ethanol may also be used in the present invention as the main source of carbon or it may also be used together with the hydrocarbon. However, when used alone, the amount of ethanol supplied is usually about 5 – 10 percent by weight. It is desireable, however, to add ethanol portionwise by 1 percent increments because when the total amount of ethanol is added at once, the growth of the strain is considerably inhibited. When ethanol is used in combination with hydrocarbon, it is desireable that the combined weight of each be between about 5 – 10 percent by weight with the ethanol portion generally being added portionwise in 1 percent increments as just stated.

As the nitrogen source there may be used ammonium sulphate, ammonium nitrate, ammonium chloride, ammonium carbonate, ammonium phosphate, urea, as well as any of those normally used in the fermentation field. Suitably, the nitrogen source is supplied in an amount of about 0.5 – 2 percent by weight.

As the organic salt, potassium dihydrogen phosphate, sodium hydrogen phosphate, magnesium sulfate, manganese sulfate, ferrous sulfate, zinc sulfate, calcium carbonate and the like are employed.

Typical of effective organic nutrients are yeast extract, meat extract, peptone, NZ-amin, corn steep liquor, casamino acid and soybean cake acid decomposate. An amount of nutrient ranging from 0.1 – 0.5 percent is desireable. In addition, it is effective to add as a growth promoting factor, thiamine, homoserine, threonine and methionine.

It is effective to add ammonia or calcium carbonate during the ferementation to control the pH at good growth levels. The ammonia may also be used to supply the nitrogen source.

Teh fermentation is carried out under aerobic conditions with shaking or with stirring and aerating. The cultivation temperature is preferably between 20° – 45°C., and more preferably between 28° – 37°C.; and the cultivation period usually from 3 – 5 days.

After the completion of cultivation, the microbial cells are removed and the L-lysine in the medium is recovered by conventional methods such as the ion exchange treatment shown in the examples.

The microorganisms Nocardia sp. No. 258-NP-3 and Nocardia sp. No. 258-NP-4 have been deposited with the American Type Culture Collection, 12301 Parklawn Drive, Rockville, Md. 20582, and are freely available to the public. They bear the following accession numbers, respectively; ATCC 21337 and ATCC 21338.

They were obtained by ultraviolet irradiation of the parent strain Nocardia sp. No. 258 following ultraviolet light irradiated cells (Killing Rate; 99.9 – 99.99 percent) were spread on the complete agar medium after intermediate cultivation. Among the colonies appeared, those which exhibited no growth on minimum medium and excellent growth on minimum medium supplemented with homoserine were selected. The mutants were purified by single cell isolation. Thus, two mutants (Nocardia sp. ATCC 21337 and Nocardia sp. 21338) were obtained.

The parent strain was isolated from soil by the enriched culture method.

It has been deposited with the American Type Culture Collection, bears Accession No. ATCC 21430 and is freely available to the public.

The following are illustrative embodiments of the present invention.

EXAMPLE 1

Nocardia sp. No. 258-NP-4 (ATCC 21338) was cultivated on a previously sterilized bouillon medium for 24 hours at 30°C. to prepare the seed culture.

A fermentation medium of the following composition was prepared. $KH_2PO_4$ 0.2 percent, $Na_2HPO_4$ 0.2 percent, $MgSO_4.7H_2O$ 0.1 percent, $FeSO_4.7H_2O$ 0.001 percent, $ZnSO_4.7H_2O$ 0.001 percent, $MnSO_4.4H_2O$ 0.001 percent, $NH_4NO_3$ 1 percent, casamino acid 0.5 percent, thiamine 10 mg/l L-homoserine 250 $\mu$g/ml and n-paraffin mixture 10 percent (pH 7.0). This medium was sterilized and to it was then added $CaCO_3$ 2 percent which had itself been previously sterilized and dried. The fermentation medium was then inoculated with the seed culture at an inoculum ratio of 10 percent and the cultivation was carried out at 28°C. for 4 days with shaking. During fermentation, the pH of the medium was controlled at neutral by adding ammonia water.

At the completion of the cultivation, the amount of L-lysine produced was 15.0 mg/ml. The microbial cells were removed and 1 liter of the filtrate was passed through a column packed with ion exchange resin, Diaion SK No. 1 ($H^+$ form). The adsorbed L-lysine was eluted with aqueous ammonia. The elute was concentrated, decolorized by active carbon and again concentrated. Alcohol was then added to crystalize 11.8 g. of crude L-lysine crystal.

EXAMPLE 2

A procedure was carried out using Nocardia sp No. 258-NP-3 (ATCC 21337) in the same manner as Example 1, except that 250 $\mu$g/ml of each of threonine and methionine was added to the initial fermentation medium. After 4 days of cultivation, the amount of produced L-lysine was 16.2 mg/ml.

EXAMPLE 3

A procedure was carried out by using Nocardia sp. No. 258-NP-4 (ATCC 21338) in the same manner as Example 1, except that soybean cake acid decomposite 0.5 percent was employed instead of casamino acid 0.5 percent. After 4 days of cultivation, the amount of L-lysine produced was 20.5 mg/ml.

EXAMPLE 4

A procedure was carried out by using Nocardia sp. No. 258-NP-3 (ATCC 21337) in the same manner as Example 1, except that 10 percent of kerosene was employed instead of n-paraffin 10 percent. After 4 days cultivation, the amount of L-lysine produced was 5.2 mg/ml.

EXAMPLE 5

Nocardia sp. No. 258-NP-4 (ATCC 21338) was cultivated on a bouillon agar slant at 28°C. for 24 hours, and then was cultivated in a yeast bouillon liquid medium for 24 hours with shaking to prepare the seed culture.

The composition of the fermentation medium was as follows: $KH_2PO_4$ 0.2 percent, $Na_2HPO_4$ 0.2 percent, MgSO$_4$.7H$_2$O 0.1 percent, FeSO$_4$.7H$_2$O 0.001 percent, ZnSO$_4$.7H$_2$O 0.001 percent, MnSO$_4$.4H$_2$O 0.001 percent, NH$_4$NO$_3$ 1 percent, casamino acid 0.5 percent, thiamine 10mg/l, L-homoserine 250 µg/ml and ethanol 1 percent (pH 7.0). This medium was then sterilized and to it was then added 2 percent of calcium carbonate which had itself been separately sterilized and dried.

The fermentation medium was inoculated with the above-mentioned seed culture at an inoculum ratio of 10 percent, and the cultivation was carried out at 28°C. for 4 days with shaking. During fermentation, a total of 10 percent of ethanol was added portionwise by about 1 percent increments. The pH of the medium was controlled at neutral by adding aqueous ammonia.

After 4 days from the starting of the cultivation, the amount of L-lysine produced was 12.1 mg/ml. After completion of the cultivation, the microbial cells were removed and 1 L of the resulting filtrate was passed through a column packed with ion exchange resin, Diaion SK No. 1. The adsorbed L-lysine was eluted with aqueous ammonia. The eluate was concentrated, decolorized by active carbon, again concentrated and alcohol added thereto to crystalize 9.6 g. of crude L-lysine crystal.

EXAMPLE 6

A procedure was carried out by using Nocardia sp. No. 258-NP-4 (ATCC 21338) in the same manner as in Example 5, except that 5 percent of an n-paraffin mixture and 1 percent of ethanol was added to the initial fermentation medium and the total amount of ethanol added portionwise was 4 percent. After 4 days of cultivation, the amount of L-lysine produced was 16.5 mg/ml.

EXAMPLE 7

A procedure was carried out by using Nocardia sp. No. 258-NP-3 (ATCC 21337) in the same manner as Example 5, except that 250 µg/ml of each of methionine and threonine were added supplementally to the initial fermentation medium. The amount of L-lysine produced after 4 days cultivation was 11.2 mg/ml.

EXAMPLE 8

A procedure was carried out by using Nocardia sp. No. 258-NP-3 (ATCC 21337) in the same manner as Example 6, except that 250 µg/ml of each of methionine and threonine were added to the initial fermentation medium. The amount of L-lysine produced after 4 days cultivation was 14.3 mg/ml.

What is claimed is:

1. A process for producing L-lysine by fermentation which comprises aerobically culturing a nutritionally deficient mutant strain of Nocardia sp. ATCC 21430 which requires at least one amino acid of the group consisting of homoserine, threonine and methionine in a nutrient medium containing from about 5 percent to 10 percent by weight of ethanol as the source of assimilable carbon, accumulating L-lysine in said medium and separating and recovering said L-lysine.

2. A process according to claim 1 wherein said ethanol is added to said medium portionwise in 1 percent increments.

3. A process for producing L-lysine by fermentation which comprises aerobically culturing a microorganism strain belonging to a species of the genus Nocardia having the morphological, culturing and physical properties of Nocardia sp. ATCC 21430; said strain being a nutritionally deficient mutant which requires at least one amino acid of the group consisting of homoserine, threonine and methionine; in a nutrient medium, having at least one carbon source selected from the group consisting of ethanol, aromatic hydrocarbons, methane, ethane, propane, butane, kerosine, light oils, n-paraffin mixtures and crude oils as the sole carbon source; accumulating L-lysine in said medium and isolating said L-lysine.

4. A process according to claim 3 wherein said nutritionally deficient mutant strain is Nocardia sp. (ATCC 21337).

5. A process according to claim 3 wherein said nutritionally deficient mutant strain is Nocardia sp. (ATCC 21338).

* * * * *